US008024866B2

(12) United States Patent
Chiorean et al.

(10) Patent No.: US 8,024,866 B2
(45) Date of Patent: Sep. 27, 2011

(54) HEIGHT RECORDING SYSTEM COMPRISING A TELESCOPIC RULE WITH TWO ENDS COOPERATING WITH AN OPTICAL BEAM SCANNING IN A HORIZONTAL PLANE

(75) Inventors: Dimitru Mircea Chiorean, Le Mesnil le Roi (FR); Zoltan Keresztes, Lorantffy Zsuzsanna (HU); Albert Gamal, Le Mesnil le Roi (FR)

(73) Assignee: Agatec, Le Mesnil le Roi (FR)

( * ) Notice: Subject to any disclaimer, the term of this patent is extended or adjusted under 35 U.S.C. 154(b) by 282 days.

(21) Appl. No.: 12/255,202

(22) Filed: Oct. 21, 2008

(65) Prior Publication Data

US 2010/0095541 A1 Apr. 22, 2010

(51) Int. Cl.
G01C 15/02 (2006.01)
G01C 15/06 (2006.01)
(52) U.S. Cl. ........... 33/293; 33/290; 33/296; 33/809; 702/166; 356/4.01; 356/141.3
(58) Field of Classification Search ............ 33/290–296, 33/227, 228, 267, 700, 809–812, 832, 833, 33/505, 506, 542.1; 702/97, 158, 159, 166; 356/4.01, 141.1, 141.3, 139.07
See application file for complete search history.

(56) References Cited

U.S. PATENT DOCUMENTS

| 4,240,208 | A | * | 12/1980 | Pehrson | 33/293 |
| 4,820,041 | A | * | 4/1989 | Davidson et al. | 356/3.12 |
| 5,313,409 | A | * | 5/1994 | Wiklund et al. | 356/4.01 |
| 5,402,223 | A | * | 3/1995 | Schlobohm et al. | 356/3.01 |
| 5,551,159 | A | * | 9/1996 | Mooty | 33/228 |
| 5,812,721 | A |   | 9/1998 | Ingvarsson et al. | |
| 5,949,548 | A | * | 9/1999 | Shirai et al. | 356/614 |
| 6,011,628 | A | * | 1/2000 | Tullis | 356/399 |
| 6,023,326 | A | * | 2/2000 | Katayama et al. | 356/141.3 |
| 6,076,267 | A |   | 6/2000 | Gotoh | |
| 6,295,174 | B1 | * | 9/2001 | Ishinabe et al. | 359/834 |
| 6,411,372 | B1 | * | 6/2002 | Donath et al. | 356/4.08 |
| 6,433,866 | B1 | * | 8/2002 | Nichols | 356/141.1 |
| 6,462,810 | B1 | * | 10/2002 | Muraoka et al. | 356/139.04 |
| 6,760,974 | B1 | * | 7/2004 | Jorgenson | 33/296 |
| 7,200,945 | B2 | * | 4/2007 | Endo | 33/290 |
| 7,564,538 | B2 | * | 7/2009 | Sakimura et al. | 356/4.01 |
| 2005/0211882 | A1 | * | 9/2005 | Ohtomo et al. | 250/221 |

* cited by examiner

Primary Examiner — Amy Cohen Johnson
(74) Attorney, Agent, or Firm — Lowe Hauptman Ham & Berner LLP

(57) ABSTRACT

A height recording system includes a telescopic rule formed from a head and a telescopic assembly used to vary a distance between one support end forming a base for the telescopic assembly and an upper end supporting the head. The height recording system comprises: a measurement system that measures the distance; a receiver including photosensitive cell(s) to detect an optical beam output from a laser system; a module starts or validates a height measurement by the measurement system starting the measurement or the validation in response to the module receiving a determined signal from the receiver; the determined signal being representative of the laser beam being detected by one of the photosensitive cells.

16 Claims, 2 Drawing Sheets

HEIGHT RECORDING SYSTEM COMPRISING A TELESCOPIC RULE WITH TWO ENDS COOPERATING WITH AN OPTICAL BEAM SCANNING IN A HORIZONTAL PLANE

FIELD OF INVENTION

The present invention relates to the field of instruments for determining level by light detection, for example sensitive to a laser beam. The invention is particularly applicable to a system for recording heights including a telescopic rule with two ends, cooperating with an optical beam scanning in a horizontal plane.

BACKGROUND ART

Height recording systems using an optical level and a graduated telescopic rule held by a second observer are known.

Systems using laser scanning on a photosensitive mast to determine a height are also known. This type of device is described in U.S. Pat. No. 5,812,721 that requires a photosensitive mast comprising a plurality of photosensitive elements arranged around the mast. This device has the disadvantage of either using a very long mast fitted with large numbers of photosensitive elements and therefore expensive, or having a mast limited in size with a small number of photosensitive sensors to reduce the price of the mast, and in this case it is impossible to measure all values of height or level difference. One example of a telescopic rule is described in document U.S. Pat. No. 6,076,267.

Therefore, the purpose of this invention is to overcome one or several disadvantages according to prior art by defining a simple device comprising few photosensitive sensors capable of efficiently and quickly measuring values of height or level difference.

SUMMARY OF THE INVENTION

This purpose is achieved by using a height recording system comprising a telescopic rule formed from a head and a set of telescopic tubes used to vary a distance between one support end forming a base of the telescopic assembly and an upper end supporting the head called the extension distance of the telescopic rule, the telescopic rule being designed to cooperate with an optical scanning beam output from a laser scanning system, in a horizontal plane, said height recording system being characterized in that the telescopic rule comprises:
- a system for measuring said distance;
- a sensitive receiver placed in the head of the telescopic rule and provided with photosensitive cell(s) to detect the optical beam output from the laser system;
- a module for starting or validating a height measurement by the measurement system, connected to the sensitive receiver and starting the measurement or the validation when it receives a determined signal from the sensitive receiver, the determined signal being representative of a detection of the laser beam by one of the photosensitive cells in the sensitive receiver.

According to another feature, the measurement system is composed of a wave emitter fixed to the upper end of the telescopic rule and cooperating with a wave receiver in a processing box of the measurement system such that the signal received by the wave receiver is processed by the processing module in the measurement system processing box to determine the distance separating the wave emitter and the wave receiver, said distance then being sent to a control box of the measurement system, said wave receiver being tuned to waves of the wave emitter and said processing box being fixed to the lower end of the telescopic rule.

According to another feature, a calibration box comprises a calibration receiver designed to receive signals emitted by the wave emitter, said received signals then being processed by a calculation module in the calibration box to determine the height separating the calibration receiver and the wave emitter, said height then being sent through a wave emitter to the measurement system control box.

According to another feature, the calibration module is fixed to one of the telescopic elements forming the telescopic rule, to compensate errors in the height recording system due to temperature variations.

According to another feature, the module that starts or validates the measurement comprises a wave emitter to transmit a signal representing the measurement of the height between the photosensitive cell impacted by the laser beam and a reference point corresponding either to a point representing the lower end of the sensitive receiver or to a point representing the centre of the sensitive receiver, to the measurement system control box.

According to another feature, the start or validation module or the measurement system control box comprises a sound generator emitting a tone as soon as the optical beam impacts the sensitive receiver.

According to another feature, the electronic measurement system control box comprises:
- a wave receiver designed to receive signals representative of the heights of the measurement system processing box, the measurement start or validation module and the calibration box respectively,
- a processing module designed to process signals received by the wave receiver to determine the extension distance or the level difference or height measured by an appropriate mathematical program, possibly by adding a distance stored in a memory of the control box and separating the reference point and the wave emitter, and a distance stored in a memory of the control box and separating the support end of the telescopic rule and the wave receiver of the processing box,
- a keyboard, that the user can use to input known heights to be stored in the control box memory.

According to another feature, the measured extension distance or level difference or height is then displayed on a display screen provided on the user interface of the control box and/or stored in the control box memory.

According to another feature, the transmission of signals between the different devices in the height recording system is of the infrared or radioelectric or ultrasound type.

According to another feature, the control box is a mobile telephone provided with software for processing measurement signals emitted by the measurement system of the telescopic rule, the measurement start or validation module and the calibration box, and the transmission is of the Wi-fi or Bluetooth type.

According to another feature, the control box memory is capable of memorising a plurality of measurements.

According to another feature, the height recording system comprises photovoltaic elements for supplying power to all elements forming the system.

Another purpose of the invention is to propose a method of making surveys using the system.

This purpose is achieved in that a user who has a laser scanning system mounted on a tripod assembly located at geometric points, takes a telescopic rule forming part of the height recording system to a first survey point, extends the telescopic elements of the telescopic rule until at least one photosensitive cell of a sensitive receiver is impacted by the optical beam of the laser system, thus provoking emission of a sound signal and measurement of the height or level difference through the measurement system; emission of the sound signal authorizes the user to retract his telescopic rule and move to another measurement point at the same time as the measurement system generates the result of the height or level difference that is then displayed on the screen and/or stored in the control box memory; when the user has reached the other measurement point, he extends the different telescopic elements of the telescopic rule until a photosensitive cell of the sensitive receiver is impacted by the optical beam and he hears a sound signal indicating that the measurement has been made and starting the measurement of the height or the level difference of this other measurement point through the measurement system; the measurement system generates another height or level difference result.

According to another feature, the previous operations are repeated until all points in the topographic survey have been scanned and the recording and/or display of all measurements has been made.

According to another feature, the height or level difference measurement is calculated by the measurement system possibly using the calibration box so that errors in the height recording system caused by temperature variations can be compensated.

Other features and advantages of this invention will appear more clearly after reading the description given below with reference to the appended drawings given as non-limitative examples.

DETAILED DESCRIPTION OF THE DRAWINGS

Figure 1:
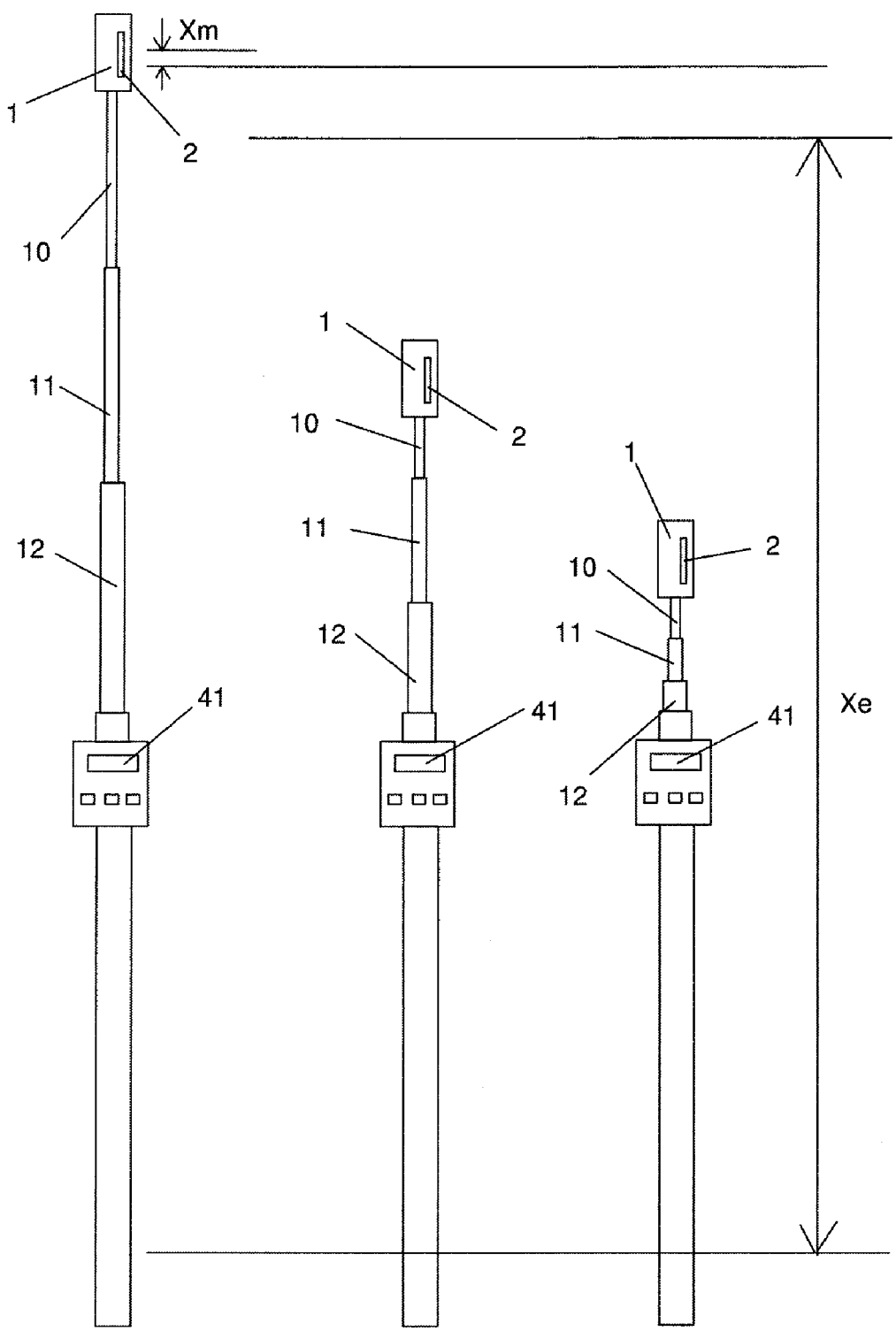
FIG. 1 is an elevation view of the telescopic measurement rule.
Figure 2:
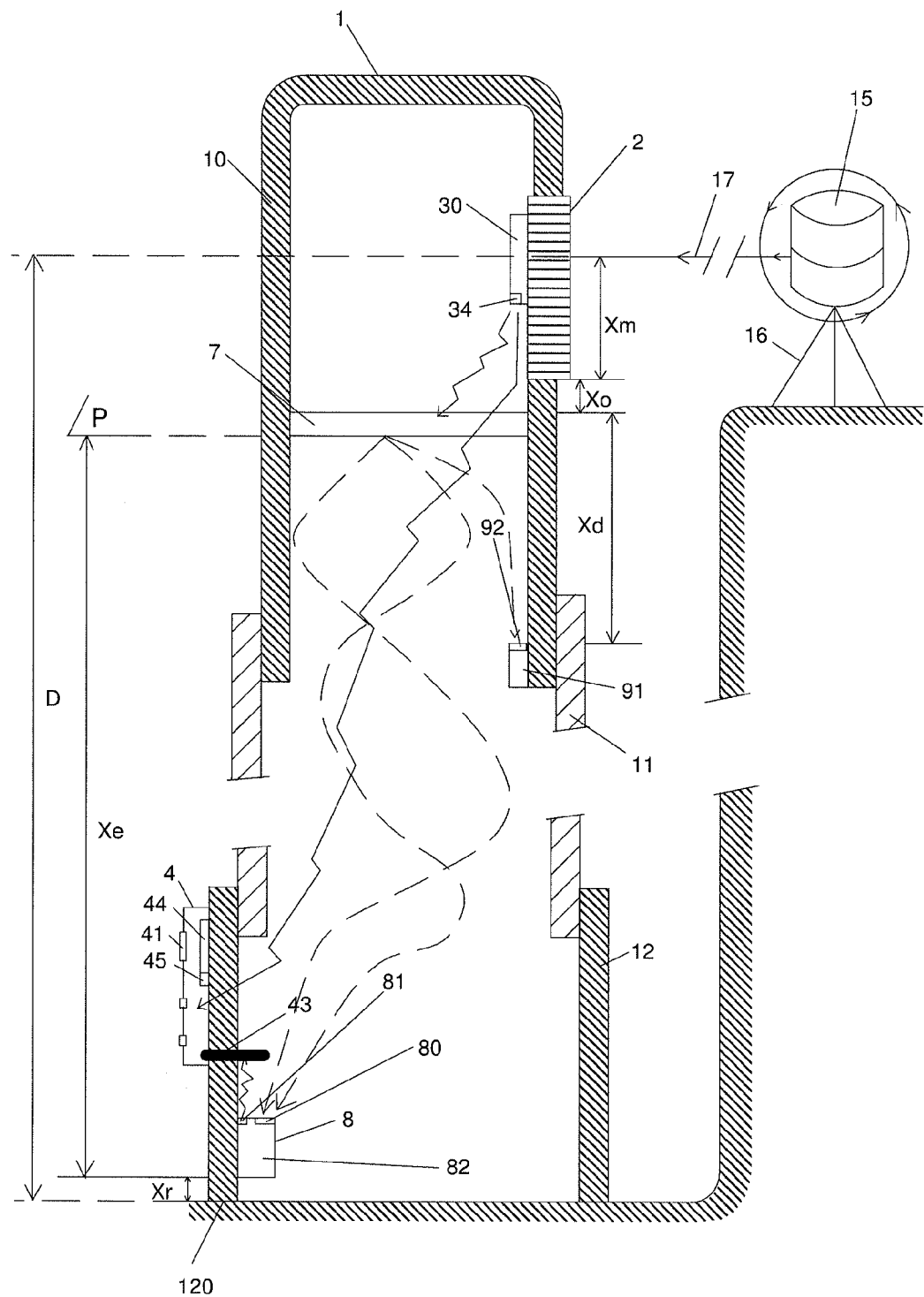
FIG. 2 is a sectional view of the rule and a view of the laser system.

A preferred embodiment of the invention will now be described with reference to FIGS. 1 and 2, in which FIG. 1 shows a telescopic rule formed from a head or end piece (1) and a set of telescopic tubes (10, 11, 12) in the form of an inverted U, the legs of the U being inserted into the ground. In one example embodiment, the structure of the telescopic rule comprises three telescopic tubes (10, 11, 12), the two ends (10, 12) and an intermediate element (11), sliding on each other.

In the example shown, the two ends (10, 12) and the intermediate element (11) are aluminum tubes sliding on each other and comprising graduations.

The first end (10) called the upper end of the telescopic rule comprises a head or end piece (1) with a diameter approximately equal to the diameter of the second end (12) called the lower end, and on its outer surface supports a sensitive receiver (2), preferably linear, for example such as a linear photoelectric sensor designed to detect a laser beam (17) originating from a laser scanning system (15), for example mounted on a tripod assembly (16).

Advantageously, a height recording system forming a survey rod can be made according to the invention to determine a height relative to a surface on which the survey rod is placed.

This height recording system comprising the telescopic rule formed from the head or end piece (1) and the assembly of at least three telescopic tubes (10, 11, 12). This height recording system can be used to vary a distance or height or level difference (D) between a support end (120) forming a base of the telescopic assembly (10, 11, 12) and an upper end (10) supporting the head or end piece (1), called the extension distance of the telescopic rule.

This height recording system advantageously includes:
  a measurement system (4, 7, 8) for measuring said distance (D);
  a preferably linear sensitive receiver (2), placed in the head or end piece (1) of the telescopic rule and provided with at least one photosensitive cell to detect a light beam such as a laser beam (17) originating from the laser scanning system (15);
  a module (30) to start or validate a height measurement by the measurement system (4, 7, 8), connected to the sensitive receiver (2) and starting the measurement or validation when it receives a determined signal from the sensitive receiver (2), the determined signal being representative of a detection of a laser beam (17) by one of the photosensitive cells of the linear laser receiver (2).

It will be understood that the distance representing the height level to be recorded and the height measured by the measurement system (4, 7, 8) may differ by a constant height that will be taken into account by the measurement system (4, 7, 8).

In one example embodiment, the start module (30) and the sensitive receiver (2) are arranged in the same box supported on the telescopic element forming the upper end (10) of the telescopic rule, this box forming the head or end piece (1) of the telescopic rule as shown in FIG. 1.

When the laser beam (17) impacts or intersects one of the elements or a photoelectric cell of the linear sensitive receiver (2), the linear sensitive receiver (2) generates an electric signal sent to the measurement start or validation module (30). Once this electrical signal has been received, the start or validation module (30) starts the measurement by sending a start signal to a wave emitter (7) through a wave emitter (34) placed in the box of the start or validation module (30) and the sensitive receiver (2).

Furthermore, the measurement start or validation module (30) is capable of determining a height or distance (Xm) between the impacted cell in the sensitive receiver (2) and a reference point or plane corresponding to either a point representative of a plane or a plane respectively passing through the end of the linear sensitive receiver (2), or to a point representative of the plane or a plane respectively passing through the centre of the linear sensitive receiver (2). This height or distance information (Xm) determined by the start or validation module (30) is sent through the wave emitter (34) to a receiver (43) of an instrumentation or control box (4) of the measurement system (4, 7, 8).

The elements (7, 8) of the measurement system (4, 7, 8) for measuring the extension distance (D) of the telescopic rule are designed to measure a distance or height (Xe) separating a reference plane (P) corresponding to the position of the wave emitter (7), for example an ultrasound emitter, of the measurement system (4, 7, 8) and a plane passing through a wave receiver (80), for example an ultrasound receiver, of an adjacent processing box (8) fixed to the lower end (12) of the telescopic rule. The wave emitter (7) of the measurement system (4, 7, 8) for measuring the extension distance is located in the reference plane (P) and fixed to the telescopic element forming the upper end (10) of the telescopic rule. As soon as the measurement start or validation module (30) starts the measurement, this wave emitter (7) sends waves to the wave receiver (80) of the processing box (8), fixed to the telescopic element forming the lower end (12). Signals received by the wave receiver (80) are then processed by a processing module (82) so as to determine the distance or height (Xe) separating the wave emitter (7) and the wave receiver (80). This distance or lo height (Xe) is then sent through an emitter (81) in the processing box (8) to the receiver (43) in the control box (4).

The processing box (8) is fixed to the lower end (12) at a height (Xr) from the support end (120) of the telescopic rule. This height (Xr) is known and is input by the user of the telescopic rule using the keyboard of the control box (4), so that it is memorised in a memory (45) of the control box (4).

The wave emitter (7) for example an ultrasound emitter, may be located in the reference plane (P) at a distance or height (Xo) from the linear sensitive receiver (2). This distance (Xo) is known and input by the telescopic rule user, using the keyboard of the control box (4) so that it is memorised in the memory (45) of the control box (4).

Advantageously, the distance (Xe) is measured quickly because the ultrasound emitter (7) cooperates with the wave receiver (80) of the processing box (8), the signal of which is generated by the processing box and processed by a processing module (82) before the emitter (81) of the processing box (8) returns it, for example an infrared emitter (81), to the receiver (43), for example an infrared receiver, of the control box (4).

A calibration box (91, 92) may be placed at a distance (Xd) from the ultrasound emitter (7). A wave receiver (91) placed in the calibration box (91, 92) receives waves emitted by the wave emitter (7) as soon as the measurement is started by the measurement start or validation module (30), such that a calculation module (91) in the calibration box (91, 92) can calculate the distance (Xd) separating the wave receiver (91) in the calibration box (91, 92) and the wave emitter (7). In one example embodiment, this calibration module (91, 92) is adjacent to and fixed to the telescopic element forming the upper end (10) of the telescopic rule.

Advantageously, the distance (Xd) is measured quickly because the calibration box (91, 92) is capable of sending this information representing the distance (Xd) through an emitter (not shown), for example an infrared emitter in the calibration box (91, 92), to the control box (4) and correcting errors due to dimensional variations of the telescopic rule. These lo dimensional variations are the result of temperature variations that occur during use of the telescopic rule.

The control box (4) is adjacent to and is fixed to the telescopic element forming the lower end (12) of the telescopic rule. The control box (4) comprises:
  the receiver (43) that will receive signals representing the heights (Xe, Xm) and possibly (Xd) sent through the emitter (81) of the processing box (8), the emitter (34) of the start module box (30) and the sensitive receiver (2), the emitter (not shown) of the calibration box (91, 92); and
  a processing module (44) designed to process signals received by the receiver (43) of the control box (4) and representing the heights (Xe, Xm) and possibly (Xd) which after they have been processed by an appropriate mathematical program in the processing module (44), and after recovery of information representing the distances (Xo et Xr) stored in the memory (45) of the control box (4), supply the result representing the height or level difference (D). The calculation made by the processing module consists of adding the distances (Xr), (Xe), (Xo) and (Xm).

After calculation, this height or level difference (D) is displayed on a screen (41), for example a digital display screen, of the control box (4) and/or memorised in the memory or the storage means (45) of the control box (4).

Note that a sound generator (not shown) emitting a beep that the user can hear as soon as the optical laser beam (17) impacts the sensitive receiver (2) is placed either in the box containing the measurement start or validation module (30), or in the control box (4). Advantageously, this beep notifies the user that the optical laser beam (17) has impacted the sensitive receiver (2) and consequently that the user can retract his telescopic rule to take another measurement at another location.

Advantageously, the user does not need to leave his telescopic rule extended throughout the duration of the calculation of the height or level difference (D) but simply for the time necessary for the laser beam (17) to impact the sensitive receiver (2).

Furthermore, the height recording system according to the invention comprises photovoltaic elements (not shown) to supply power to the different components of the height recording system.

In one variant embodiment, infrared or ultrasound transmission systems could be replaced by other transmission systems such as Wi-fi or Bluetooth, and the control box (4) does not have to be fixed to a telescopic element of the telescopic rule, but may simply be a mobile telephone comprising Bluetooth communication means and software adapted to the reception of measurements made by the processing module (8), the calibration box (91, 92) and the box containing the measurement start or validation module (30) and the linear sensitive receiver (2) used to calculate the level difference or height (D) measured by the telescopic rule and to display this level difference or this height (D) on traditional display means of the mobile telephone.

In another variant embodiment, the system to measure the telescopic rule extension distance (D) may be a tape or a wire fixed at one end to one of the telescopic elements forming one of the ends (10, 12) of the telescopic rule, and at the other end to a drum mounted free to rotate on the other telescopic element forming one of the ends (10, 12) of the telescopic rule.

In another variant embodiment of this system, the calibration receiver (92) may be placed at a distance to be determined by the calculation module (92) of the calibration box (91, 92), this distance separating the calibration receiver (92) and the receiver (80) of the processing box (8). This calibration receiver (92) enables correction of errors due to dimensional variations of the telescopic rule due to temperature variations while the telescopic rule is being used, by sending this information to the control box (4).

The advantage of such a telescopic rule is that it can be used to make topographic measurements by a single user who begins by placing the laser scanning system (15) on a tripod assembly (16) at a point on the site, and then moves to the required measurement locations, extends his telescopic rule until the linear sensitive receiver (2) is impacted by a laser beam (17) at a point, and this impact generates firstly the measurement and secondly emission of a sound signal notifying the user that he can retract his lo telescopic rule and go onto another measurement point. During this time, the electronic measurement system (4, 7, 8) of the height recording system generates the measurement result that is then stored in the control box (4) and/or displayed on a screen (41) of the control box (4). When the user reaches another measurement point, he extends the telescopic rule until the laser beam (17) impacts an element or cell on the linear sensor receiver (2), once again causing emission of a sound signal and starting the measurement through the measurement system (4, 7, 8) built into the telescopic rule, and then display and/or storage of the measured result.

Thus, it is easy to understand the advantage of such a system by the fact that it makes it faster to take measurements, and secondly savings in use because it can be used by a single person. The fact of using a sensitive linear receiver (2) also makes high precision possible. Alternately, the invention could be used for a low cost system (less precise and/or slower) that is still advantageous compared with the conventional survey rods, comprising a non-linear cell, possibly with a lens system to increase the detection zone. It can be understood that with a lens, little time will be lost in obtaining the height but the precision will also be lower.

It must be obvious for persons skilled in the art that the invention can be used with very many other specific embodiments without going outside the scope of the invention as claimed.

The invention claimed is:

1. Height recording system comprising a telescopic rule formed from a head and a set of telescopic tubes for varying the distance between one support end forming a base for the telescopic assembly and an upper end supporting the head, called the extension distance of the telescopic rule, the telescopic rule being arranged to cooperate with an optical scanning beam output from a laser scanning system, in a horizontal plane, the telescopic rule including:
   a measurement and calculation system for measuring and calculating said extension distance;
   a sensitive receiver, in the head of the telescopic rule, including photosensitive cells to detect the optical beam output from the laser system;
   a module for starting or validating a height measurement by the measurement and calculation system, connected to be responsive to the sensitive receiver and to the measurement and calculation system, and starting the measurement or the validation in response to the module receiving a determined signal from the sensitive receiver, the determined signal being representative of detection of the laser beam by one of the photosensitive cells in the sensitive receiver.

2. System according to claim 1, wherein the measurement system includes a wave emitter fixed to the upper end of the telescopic rule and arranged to cooperate with a wave receiver in a processing box of the measurement system for enabling the signal received by the wave receiver to be processed by a processing module of the processing box in the measurement system to determine the distance separating the wave emitter and the wave receiver, the processing module of the processing box being arranged to send said distance to a control box of the measurement system, said wave receiver being tuned to waves of the wave emitter and said processing box being fixed to the lower end of the telescopic rule.

3. System according to claim 2, wherein a calibration box comprises a calibration receiver for receiving signals emitted by the wave emitter, a calculation module in the calibration box for processing said received signals and for determining the height separating the calibration receiver from the wave emitter, and a wave emitter for sending an indication of said height to the control box of the measurement system.

4. System according to claim 3, wherein the calibration module is fixed to one of the telescopic elements forming the telescopic rule, to compensate errors in the height recording system due to temperature variations.

5. System according to claim 3, wherein the sensitive receiver is linear and wherein the control box of the electronic measurement system comprises:
   a wave receiver for receiving first, second and third signals representative of the heights of the processing box of the measurement system, the measurement start or validation module and the calibration box respectively;
   a memory;
   a processing module for processing the first, second and third signals received by the wave receiver to determine the extension distance or the level difference or height measured by an appropriate mathematical program, by adding a first distance stored in a memory of the control box and separating the reference plane from the linear sensitive receiver and a distance stored in the memory of the control box and separating the support end of the telescopic rule and the wave receiver of the processing box; and
   a keyboard for supplying to the memory of the control box known heights to be stored in the memory of the control box.

6. System according to claim 5, wherein the memory of the control box is arranged for memorizing a plurality of measurements.

7. System according to claim 6, wherein the system is configured to generate a topographical survey and store the measurements in the memory.

8. System according to claim 2, wherein the module for starting or validating the measurement comprises a wave emitter to transmit a signal representing the measurement of the height between the photosensitive cell impacted by the laser beam and a reference point corresponding either to a point representing the lower end of the sensitive receiver or to a point representing the center of the sensitive receiver, to the control box of the measurement system.

9. System according to claim 8, wherein the start or validation module or the control box of the measurement system comprises a sound generator for emitting a tone in response to the optical beam impacting the sensitive receiver.

10. System according to claim 2, further including a controller for causing the measured extension distance or level difference or height to be (a) displayed on a display screen on a user interface of the control box or (b) stored in the memory of the control box, or both (a) and (b).

11. System according to claim 2, wherein the wave emitter is configured to emit signals of an infrared or radio electric or ultrasound type.

12. System according to claim 2, wherein the control box is a mobile telephone including software for processing measurement signals emitted by the measurement system of the telescopic rule, the measurement start or validation module and the calibration box and the transmission being of a Wi-fi or Bluetooth type.

13. System according to claim 2, wherein the wave receiver is configured to receive signals of an infrared or radio electric or ultrasound type.

14. System according to claim 1, wherein the height recording system comprises photovoltaic elements for supplying power to all elements of the system.

15. System according to claim 1, wherein the sensitive receiver is linear.

16. System according to claim 1, wherein the measurement and calculation system is configured to automatically calculate said extension distance.

* * * * *